US009830483B2

United States Patent
Caso

(10) Patent No.: US 9,830,483 B2
(45) Date of Patent: Nov. 28, 2017

(54) SECURITY AND IDENTIFICATION SYSTEM AND METHOD USING DATA COLLECTION AND MESSAGING OVER A DYNAMIC MESH NETWORK

(71) Applicant: Mesh Candy, Inc., Santa Ana, CA (US)

(72) Inventor: Richard Brand Caso, Mission Viejo, CA (US)

(73) Assignee: MESH CANDY, INC., Santa Ana, CA (US)

( * ) Notice: Subject to any disclaimer, the term of this patent is extended or adjusted under 35 U.S.C. 154(b) by 0 days.

(21) Appl. No.: 15/197,598

(22) Filed: Jun. 29, 2016

(65) Prior Publication Data

US 2017/0017815 A1    Jan. 19, 2017

Related U.S. Application Data

(60) Provisional application No. 62/185,990, filed on Jun. 29, 2015.

(51) Int. Cl.
*G06K 7/10* (2006.01)
*G07C 9/00* (2006.01)
(Continued)

(52) U.S. Cl.
CPC ..... *G06K 7/10257* (2013.01); *G06K 7/10366* (2013.01); *G07C 9/00031* (2013.01);
(Continued)

(58) Field of Classification Search
CPC .......... G06K 7/10257; G06K 7/10366; G06K 2017/0045; G07C 9/00111;
(Continued)

(56) References Cited

U.S. PATENT DOCUMENTS 7,324,824 B2    1/2008    Smith et al.
7,760,649 B2    7/2010    Song
(Continued)

FOREIGN PATENT DOCUMENTS

EP    1994696 A2    3/2011
GB    2442680 A     4/2008

*Primary Examiner* — Claude J Brown
(74) *Attorney, Agent, or Firm* — Jonathan A. Kidney; CKR Law

(57) ABSTRACT

Various solutions for acquiring data across a deployed encrypted mesh network, using a digital security controlled, identification badge or tag. The communications are facilitated to the respective portable device via nodes within the deployed encrypted mesh network, supervised by a hierarchal managing system. A distributed security code is affiliated and triggers an audible or visible signal shared across the network, either as a verification signal or status signal. A counterfeit, non-connected device would not display the correct image, or cue used to validate the identification credentials, etc. and, thereby indicate to immediate personnel that the badge (and the wearer, thereof) is not authorized. Assets can such as cargo containers, pallets, security boxes, etc., with an asset tag are similarly protected. An unauthorized shipment with its counterfeit tag would fail to reflect the appropriate status pursuant to the updated security code to the attending personnel.

16 Claims, 18 Drawing Sheets

(51) Int. Cl.
  *H04W 12/06* (2009.01)
  *G06K 5/00* (2006.01)
  *G06K 17/00* (2006.01)
(52) U.S. Cl.
  CPC ...... G07C 9/00103 (2013.01); G07C 9/00111 (2013.01); H04W 12/06 (2013.01); *G06K 2017/0045* (2013.01)
(58) Field of Classification Search
  CPC ............ G07C 9/00031; G07C 9/00103; G06Q 20/34; G06Q 20/341; H04L 63/0492
  See application file for complete search history.

(56) References Cited

U.S. PATENT DOCUMENTS

| | | | |
|---|---|---|---|
| 8,041,369 B2 | 10/2011 | Smith et al. | |
| 8,103,333 B2 | 1/2012 | Tran | |
| 8,457,013 B2 | 6/2013 | Essinger et al. | |
| 8,559,447 B2 | 10/2013 | Jetcheva et al. | |
| 2005/0231365 A1* | 10/2005 | Tester | G06K 19/07798 340/568.1 |
| 2006/0290519 A1* | 12/2006 | Boate | G07C 9/00111 340/573.4 |
| 2010/0060452 A1* | 3/2010 | Schuster | G08B 13/2402 340/572.1 |
| 2011/0223937 A1 | 9/2011 | Leppanen et al. | |
| 2012/0011365 A1 | 1/2012 | Schmidt et al. | |
| 2012/0294182 A1 | 11/2012 | Handforth et al. | |
| 2014/0074696 A1* | 3/2014 | Glaser | G06Q 20/341 705/39 |
| 2014/0295786 A1* | 10/2014 | Maier | H04W 4/22 455/404.2 |
| 2014/0333412 A1* | 11/2014 | Lewis | G07C 9/00031 340/5.2 |
| 2015/0083804 A1* | 3/2015 | Chorba | G06K 19/073 235/382.5 |

* cited by examiner

*200*

Possible Options: Clock In → Long Press Button #1    Display On
                  Clock Out → Long Press Button #1   Display Off w/ "OFF"

Lunch Break "IN"  → 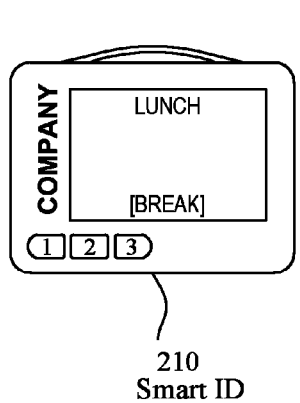 Tilt 180° x 2 → Display "Break" or "Lunch"
Lunch Break "OUT" → Tilt 180° x 2 → Display ON Call Supervisor → Button #1 and #3 → Light LED

*Lunch In / Out* → Long Press Button #2 → Display Lunch (IN / OUT)
*Break In / Out* → Long Press Button #3 → Display Break (IN / OUT)

Fig. 2A

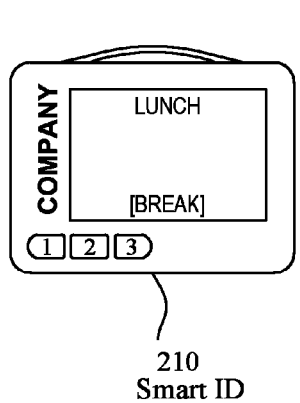

210
Smart ID

Fig. 2B

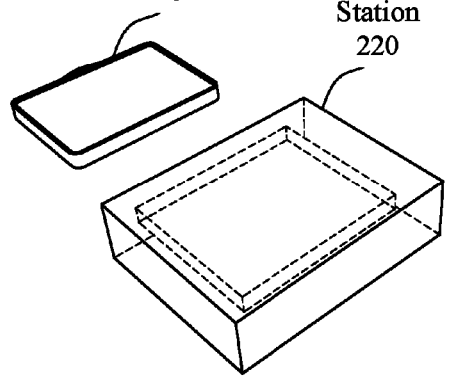

Asset Tag or Smart ID 230 or 210

Charging Station 220

Fig. 2C

SECURITY AND IDENTIFICATION SYSTEM AND METHOD USING DATA COLLECTION AND MESSAGING OVER A DYNAMIC MESH NETWORK

CROSS-REFERENCE TO RELATED APPLICATION(S)

This application claims the benefit of U.S. Provisional Patent Application No. 62/185,990, filed Jun. 29, 2015, the contents of which are hereby incorporated by reference in its entirety.

Field

The present invention is directed to the field of wireless data gathering and communication. More particularly, the present invention is directed to one or more of asset locating, environmental monitoring, verifiable employee identification, distributed messaging, bidirectional notification, across a dynamic mesh network.

Background

Identification of personnel and valued items are a growing concern in high value or security conscious environments. For example, in most industries, the typical identifier is a simple photo badge, which offers little security against counterfeiting. Further, such tags can be stolen and/or altered to allow access to high security areas. This is a wholesale problem in medical, high-technology, military, financial institutions, gambling and other high traffic environments. U.S. Pat. Nos. 7,324,824, 8,041,369, 8,103,333, 8,457,013, 8,559,447 and U.S. Patent Applications 2011/0223937, 2012/0011365 , and 2012/0294182 , for example, contain discussions on rudimentary prior approaches to mesh systems and identification systems. However, all of these systems have simplistic tags or, conversely, are overly cumbersome with complicated solutions that do not adequately address "validation" of the identification devices against its environment.

Therefore, there has been a long-standing need for more elegant systems and methods for ensuring the integrity of identification badges and "tagged" items, and other security related concerns. Aspects of a new system(s) and method(s) to address these concerns are elucidated in the following detailed description.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, an automated method for protecting against a falsified identity of a person and/or object amongst authorized identities of persons and/or objects is provided, comprising: registering at least one of a user's identity and asset to be tracked in a trusted database; associating at least one of the (a) registered user's identity and a user's image with a mesh-communication capable digital identification badge, the badge being wearable and comprising a microprocessor with RF capabilities, user-actuated button, LED, display, buzzer, antenna, and motion sensor, and (b) registered asset with a mesh-communication capable digital identification asset tag, the tag being attachable to the asset and comprising a microprocessor with RF capabilities, user-actuated button, LED, display, buzzer, and antenna; locally networking the at least one badge and tag into a mesh network, the mesh forming between registered devices having a shared authorization; wirelessly sending from a network node an encrypted and varied security code to the locally meshed badge and/or tag; receiving into the locally meshed badge and/or tag, the security code; validating the security code and changing at least one of an audible or visual characteristic in all locally meshed badges and/or tags, wherein a counterfeit identification device is made evident to surrounding mesh devices due to its inability to match the changed audible or visual characteristic.

In other embodiments, the above method is provided, further comprising, detecting at least one of a current location, status, temperature, orientation of the badge and/or tag and recording a history thereof for visual playback; and/or wherein the badge displays an electronic image of the registered user; and/or wherein the changed characteristic is at least one of an indicator's color, rate of indicator period, frequency of indicator sound, background color of a user's displayed image, word, and logo; and/or wherein the badge is utilized as a timeclock, displaying at least one of a "clock-in," "clock-out," "break," "off-break" status and a status is alterable by an user input to the badge; and/or wherein the status is altered by changing an orientation of the badge; and/or wherein the badge and/or tag further senses at least one of temperature, humidity, pressure, orientation, and light; and/or further comprising, communicating to a secondary gateway communication device having a network access antenna and a secondary antenna for local communication with mesh devices, the secondary device acting as a gateway node to the trusted database for the meshed badges and/or tags; and/or further comprising, communicating at least one of a message or alert from the trusted database to a badge, a message or alert between badges, a message or alert to a non-meshed badge or non-meshed smart phone; and/or wherein the message includes at least one of a break reminder, ergonomic activity reminder, and company message; and/or wherein the communicated message or alert is based on different levels of security or access; and/or wherein a communication rate with the network node is variable and increased if a rate of motion of the badge and/or tag is above a pre-determined threshold; and/or further comprising: loading an app into a smart phone; registering the use of the smart phone via the app; and joining the mesh as proxy to the badge; and/or wherein the registering is performed using a cellular network.

In yet another aspect of the disclosed embodiments, an automated system for protecting against a falsified identity of a person and/or object amongst authorized identities of persons and/or objects is provided, comprising: a trusted database having identity information of a registered person and/or registered asset; at least one of (a) a mesh-communication capable digital identification badge, the badge being wearable and comprising a microprocessor with RF capabilities, user-actuated button, LED, display, buzzer, antenna, and motion sensor, and (b) registered asset with a mesh-communication capable digital identification asset tag, the tag being attachable to the asset and comprising a microprocessor with RF capabilities, user-actuated button, LED, display, buzzer, and antenna; a local communication mesh between the at least one badge and tag, the mesh formed between registered devices having a shared authorization; a network node with a wireless connection, sending an encrypted and varied security code to the locally meshed devices; software instructions in the at least one locally meshed badge and tag, validating the security code and changing at least one of an audible or visual characteristic in the badges and/or tags, wherein a counterfeit identification device is made evident to surrounding mesh devices due to its inability to match the changed audible or visual characteristic.

In other embodiments, the above system is disclosed wherein the changed characteristic is at least one of an indicator color, rate of indicator period, frequency of indicator sound, background color of a user's displayed image, word, and logo; and/or wherein the badge or tag further contains at least one of an accelerometer, temperature sensor, humidity sensor, pressure sensor, gyroscope, and photodetector; and/or further comprising, a secondary gateway communication device having a network access antenna and a secondary antenna for local communication with mesh devices, the secondary device acting as a gateway node to the trusted database for the meshed badges and/or tags; and/or further comprising: a smart phone; and an app loaded onto the smart phone, the app interfacing with the trusted database and permitting a user to register with the trusted database, wherein the app enables the smart phone to join the mesh as a proxy to the badge.

BRIEF DESCRIPTION OF THE DRAWINGS

FIG. 2A is a selection step illustration of an exemplary system using a Smart Badge/ID as a Time Clock.

FIG. 2B illustrates on possible button and display arrangements for a Smart Badge/ID.

FIG. 2C illustrates a possible charging station for an asset tag or Smart ID.

DETAILED DESCRIPTION

Figure 1:
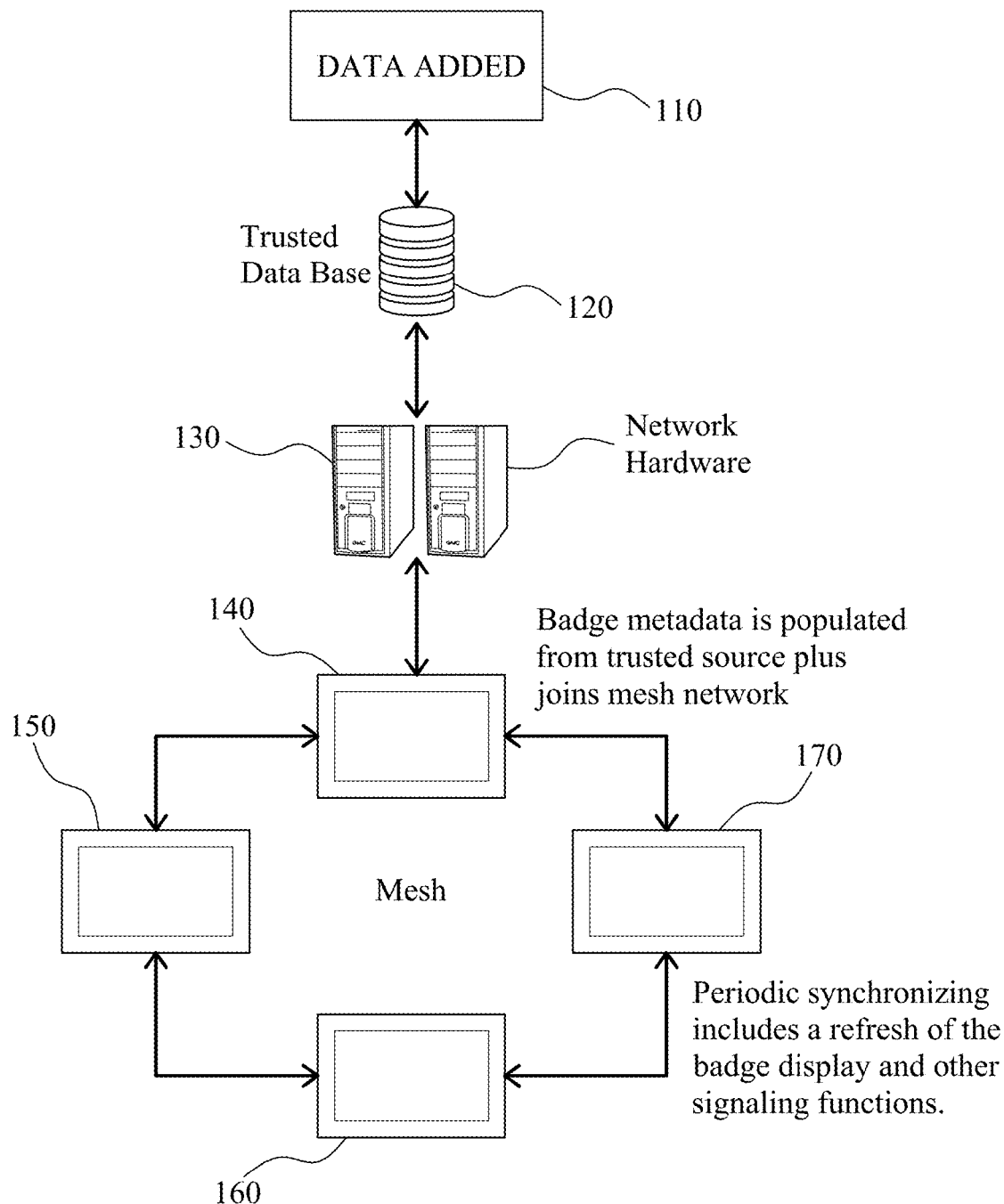
FIG. 1 illustrates an exemplary system according to one possible deployment scenario.

The present disclosure presents various solutions for acquiring data across a deployed encrypted mesh network, while providing a compact and robust environment for message communication to personnel using a digital security controlled, identification badge or tag. The communications are facilitated to the respective identification badge or tag via nodes within the deployed encrypted mesh network, which is supervised by a hierarchal managing system connected to the mesh network.

With respect to the interaction between various hardware elements, the exemplary system can change the distributed security code that is affiliated with one or more of the hardware nodes, asset tags, and identification badges, etc. The code could trigger an audible, mechanical, visual, ultrasound, infrared or similar cue that is signaled and shared across the network, either as a verification signal or status signal. For example, if a counterfeit identification badge, asset tag or other security device is introduced to the network, it would not be able to communicate across the encrypted mesh network and also would not be privy to the changes in the security code that authentic badges, asset tags or other security would reflect. The counterfeit identification badge would either not display the correct image, fail to express the correct cue used to validate the identification badge credentials, etc. and, thereby indicate to immediate personnel that the counterfeit badge (and the wearer, thereof) is not authorized. By way of extension, a similar scenario can be applied to assets, such as, for example, cargo containers, pallets, security boxes, etc., that have been "tagged" with an asset tag. The introduction of an unauthorized asset into a shipment would soon be identified as unauthorized by its counterfeit asset tag failing to reflect the appropriate status pursuant to the updated security code to the attending personnel.

For some embodiments, the following non-limiting examples may be used—all (or a designated subset) authorized badges or tags could uniformly, in toto change a status indicator's color (for example, from blue to yellow), or the rate of an indicator period (for example, flashing rate changing from slow to fast, or the sequence changing). Other possible examples could be an audible beep rate, or tone of the beep/sound. Another example specifically tailored for identification tags, the background of all (or a designated subset of) the wearer's picture, wording, logo, could change color or have a different look presented, or the image of the authorized user would be altered/re-imaged in a pre-determined manner. Such changes would be visible and/or audible so to be apparent to the users and bystanders.

In some embodiments, the mesh network nodes can be configured to have a variable communication rate. In some embodiments, the communication rate (whether data density or data frequency, or combination thereof) can be made to be motion-sensitive. That is, the communication rate can adjust to movement of the respective security tag or device. For example, the movement of the security device can be sensed by a motion sensing device, for example, an accelerometer. The "accelerometer" can be awoken when the "G" force (or other motion-indicating force or field) exceeds a pre-defined threshold (or series of thresholds, or "amount" of movement within a specified time period). Once the appropriate level of motion is sensed, a microcontroller in the security tag/ID and/or the supporting node is notified and a higher or more frequent data rate is initiated. Increased data is then sent from/to the mesh node for a defined period of time or until the "accelerometer" has not sensed movement for a defined period of time, wherein the data is reduced or put to sleep until the next movement indication. Decreasing the rate of transmission assists in limiting network congestion, while reducing power consumption for a mobile device. Therefore, having motion-sensitive data rates allows for extended device usage.

In the following examples, it should be understood some mesh-communicating and security/location functionalities between and exemplary asset tag and exemplary Smart Badge may be shared, wherein the exemplary Smart Badge may have additional ID-related functionalities, as further described below. Therefore, depending on the deployment scenario, the exemplary asset tag nomenclature may be substituted with an exemplary Smart Badge or vice versus, without departing from the spirit and scope of this disclosure.

Identification Tagging—from Stickers to Active Security Badging

Properly identifying an individual is a daily operational activity for many enterprises. This is a requirement that transverses multiple industries. A Personal Identification Verification system is a foundational concept for the Homeland Security Presidential Directive 12 (HSPD-12) established in 2004 as the standard for a secure form of identification for federal employees and contractors. This standard offers a baseline of requirements that are foundational for any identification verification system.

HSPD-12 Compliant Identification Requirement Highlights

To be issued based upon sound criteria for verifying an individual's identity

Strongly resistant to fraud, tampering, counterfeiting, and terrorist exploitation Rapid authentication electronically ID card providers are required to move through an official accreditation process (Note: The FIPS 201 standard has structured the HSPD-12 requirements)

The FIPS 201 standard utilizes an authentication method through a centralized system built upon a chain of trust. The trust process chain consists of five sequential steps: identify proofing and registration, I-9s and fingerprinting linked to individual, FBI/NACI database check, confirm biometrics, and issuance of badge.

Standard conforming badges have embedded chips on-board that can store encrypted security keys that can be unlocked with the use of a PIN. The chips must also support an expiring use period. The requirements described above are meant to better improve the level of security for Federal operations and greater efficiencies through a shared solution platform. The exemplary embodiments fulfill the requirements of FIPS 201, yet go beyond and offer additional layers of verification.

Specifically, in various exemplary embodiments, synchronized signaling across a network to mesh-connected Smart Badges (or tags) is enacted. Included in the signaling are instructions that prompt the Smart Badges (or tags) to any one or more of displaying a particular image, expressing an audible sound, illuminating an LED/IR, or other means including sending a verification signal across the network. The verification signal would broadcast to local Smart Badges' (or tags) users connected to the network. Individual photos and other metadata associated with the Smart Badges (or tags) holders on the network would be made available through user Smart Badges (or tags). Those Smart Badges (or tags) having a common network mesh or a shared security/authorization level would reflect the changed device characteristic, thus exposing non-authorized/counterfeit devices who do not reflect the changed characteristic. Multiple approaches, known to those of skill in the art, may be used to verify Smart Badges (or tags) over the mesh network. It is believed that verifying an identification badge (or tag) on a mesh network using synchronized signaling, triggered by unsynchronized verification requests and then returning a validation signal using audio and visual cues in addition to validation sent through a separate network from a trusted database, is a significant paradigm shift in the current state of the art.

Communication can be directed to individuals, groups or broadcast to all devices within the domain. Further, multiple application groups can be supported over the mesh network, with each "group" having different levels of security, access, etc. For example, if a security breach is detected, the supervisor or security may be notified differently than the nearby personnel. As described below, the various embodiments provide multiple capabilities including Personal ID Verification, Environmental Sensing, Activity Monitoring, Workflow Tracking, Extended Communication.

The latter capability can be exploited for high security areas where personal communication devices (phones) are not allowed. Here, the Smart Badges may be used as texting, notification devices to respective parties, if so configured. Thus, providing a mobile communication ability, having the necessary security features that an enterprise or company may wish to provide.

FIG. 1 illustrates an exemplary system 100 according to one possible deployment scenario. Within the Enterprise, the central verification function is performed by human resources 110 with access to a trusted database 120. This initial verification step addresses the requirement for sound criteria for verifying an individual's identity. Human Resources personnel would verify and then upload the individual's meta-data including an electronically reproduced photo or identifier, via network hardware 130 supporting a mesh network to the Smart tag/badge 140. This information would then populate the Smart tag/badge 140 over a secure link. The Smart tag/badge 140 would be one of several other Smart tag/badge 150, 160, 170 within the mesh network formed between the Smart tags/badges. (It is understood that a similar approach can be applied to merchandise or goods that are being asset "tagged.")

Once on the mesh network, verification is performed actively and routinely. The exemplary Smart tag 140 (150, 160, 170) could be configured without preloading a date of expiration. Validation is performed dynamically, randomly, periodically or at designated events, using the central system or a master unit for validation. The Smart tag 140 (150, 160, 170) then verifies itself to others on the mesh network with an electronic image of the authorized individual (or identifier) with one or more unseen methods of verification that change frequently. The electronic image (e.g., photo of authorized user associated with the Smart tag 140 (150, 160, 170)) would foil an intruder from overlaying his/her own image on the Smart tag 140 (150, 160, 170), since during a security cycle the true image would be updated to the Smart tag 140 (150, 160, 170), and when additional security is required, some visual or audible indicator would altered in the respective tag, one that is shared amongst all the authentic tags. The Smart tag 140 (150, 160, 170) can be associated with a network node and its location is known in the moment and historically. It also provides a convenient platform for messaging communication across the enterprise, if the Smart tag/badge is configured with communication capabilities. The Smart tag/badge data can also be available in aggregate for more advanced modeling.

There are many options when considering an Enterprise identification system. An on demand printed sticker, printed PVC cards, passive verification cards and the more advanced active Homeland Security cards with encryption can be used as part of the Smart tag/badge ecosystem. The exemplary system offers a solution that offers better validation, workflow history and includes (In some embodiments) a communications platform.

The exemplary mesh network can also be configured for location mapping for workflow analysis, and/or use of a Badge as a time clock and/or with Station Hardware and/or Security verification and validation. While the above embodiment illustrates the mesh devices as Smart tag/badge(s), it is contemplated other devices that able to communicate with the mesh network can be added, if properly configured. Thus, in some scenarios, with properly installed software on the "other device," capabilities akin to those provided by the Smart tag/badge can be duplicated. This facilitates a bring your own device (BYOD) option to the network. A classic other device example would be a smart phone. Of course, security and compliance with the trusted database 120 is presumed for the "other device."

FIG. 2A is a selection step illustration 200 of an exemplary system using a Smart Badge/ID as a Time Clock. FIG. 2B illustrates on possible button and display arrangements for a Smart Badge/ID 210. FIG. 2C illustrates a possible charging station 220 for an asset tag 230 or Smart ID 210, and is understood to be self-explanatory. Looking to FIGS. 2A-B, there are multiple use patterns that could be used applied using Smart ID-based buttons, dials, switches, touch (response to touch sensitive areas, or personalized finger movement) tilt or other user input. In addition to sending the time clock information across the network, confirmations can be sent to the Smart ID display. Utilizing buttons, switches, motions, etc. (or touch), the Clock-In signal, upon arrival can be initiated by the user, for example, long-pressing a designated button (button 1, for example). This would trigger the user's ID and the user's image would be displayed. Prior to this initiation, the display would be off and indicate as such. Clocking-In is made is possible when connected to the network. Location of activity is also collected, if so desired.

In one scenario, for Lunch—when a secondary button (button 2, for example) is depressed for a long hold the Smart ID 210 will display "Lunch" and when button #2 is depressed again, the Clock-In image and user's ID would be displayed, as the employee is now back to work. For Breaks—understanding breaks are mandatory with a defined formula for compliance with State laws, the Smart ID 210 can send data notifying the employee when a break is required and then confirm compliance. The Smart ID 210 could alter its displayed image, depending on the activity status of the user. For example, a lunch break indicator could be displayed, or a different color shown either in the display or via an indicator light.

It should be apparent that the user use described above is only one of many, many possible combinations of button, user input, to arrive at the desired result. For example, an alternative Break signaling mode can be activated by the user tilting the Smart ID 180 degrees, perhaps two times, or shaking it (or in combination with a button press) to indicate to the user in that the user is on break or off break. This could also be achieved by the user reversing the badge's orientation (up-down, or front-back). For alerting Supervisors or other personnel, the user could press multiple buttons, etc. at the same time. For example, a Supervisor request can be activated via pressing buttons 1 and 3, which would be accompanied by a visual signal (LED, or flashing image, etc.). In some embodiments, the Smart ID 210 may queue up a list of standard messages (or notification type/category/request) for selection by the user and be sent to the alerted Supervisors or party. In other embodiments, the Smart ID 210 may allow the user to type in a message. The exemplary Smart ID 210 can be hardware designed to be usually on read/listening mode and ready to forward data when necessary.

In some embodiments, the information received from the user's Smart ID 210 can be applied against regulatory requirements from the State or Federal government (or to internal requirements). This allows the network to proactively send reminder notifications for breaks, lunch, etc. Further, with customized communication, users can receive ergonomic reminders (stand up every 20 minutes, etc.) or a company wide message (e.g., Special meeting called). Of course, users can also initiate communication to other users across the network, either individually, in groups, or broadcast.

It is apparent from the capabilities of this system that location mapping for a commercial workflow embodiment is possible using assets that are tagged with mesh-integrated badges, tags, of hardware. After gathering asset location over time, a history of asset location can be displayed in variable playback speeds. Multiple assets can be selected for location and time-tracking. In addition, environmental and activity data can tracked.

Figure 3:
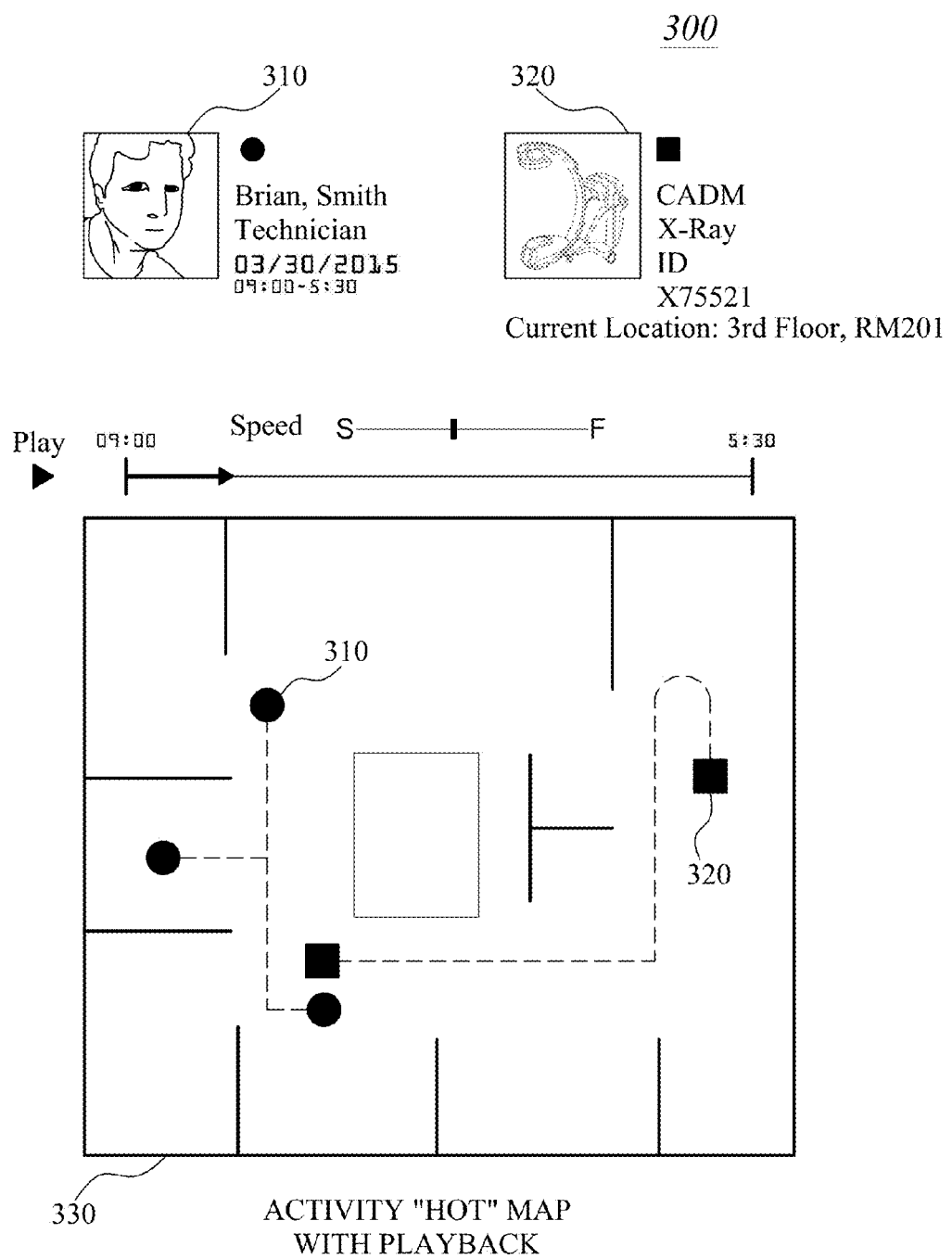
FIG. 3 is an illustration of exemplary location/activity tracking.

FIG. 3 is an illustration 300 of location/activity tracking for a user and equipment. The user, shown here as a fictitious Brian Smith, x-ray technician 310, wearing a Smart Badge with his location history mapped, as well as his activity history (round black). This example is in the context of hospital with asset tagged x-ray machine 320 (square black), however is applicable to any industry or environment. The mapping 330 can be historical to record the break status, to provide environmental, activity tracking of the technician 310 and equipment 320. In some embodiments, 3-D imaging or tracking can be provided. This configuration using Smart Badges with asset tagging correlates users with equipment. This is significantly more efficient than having a sign-out ledger that the user is required to sign when checking out equipment, as in the prior art.

Figure 4A:
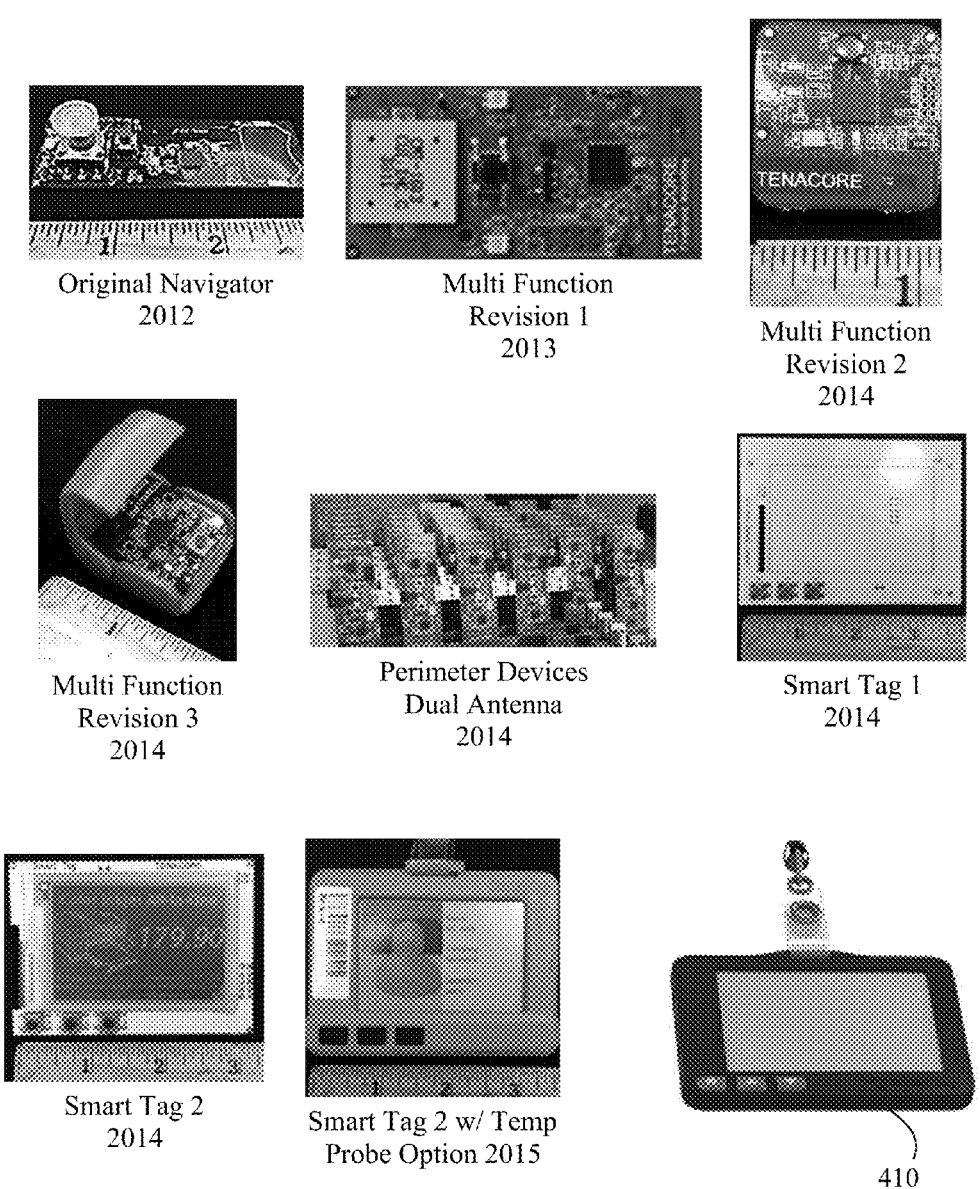
FIG. 4A is photo-representation of one possible embodiment of the Smart Badge and shows the evolution of the hardware design.

FIG. 4A are representations showing the evolution of various hardware designs, including a perimeter device and ultimately a Smart Badge, the last representation 410 showing a Smart Badge design formulated in 2015 with its small form factor. Evident is the miniature size of the Smart Badge 410, the housing thereof being approximately 3½ inches in width. Of course, other possible sizes are possible, but FIG. 4A illustrates the compactness—a feature much needed to be commercially attractive as a wearable badge. FIG. 4A is demonstrative of aspects of a functioning Smart Badge 410 with embedded microcontroller(s)/transceiver, battery, I/O port, electronic display, buttons (home, scroll, etc.), and so forth (shown in FIG. 4B).

In some commercial embodiments, the Smart Badge 410 is configured with a low power 2.7" e-ink display. In other embodiments, the Smart Badge 410 may have additional sensors, such as temperature probe (e.g., −200 C-200 C), smoke, radiation, etc.

Figure 4B:
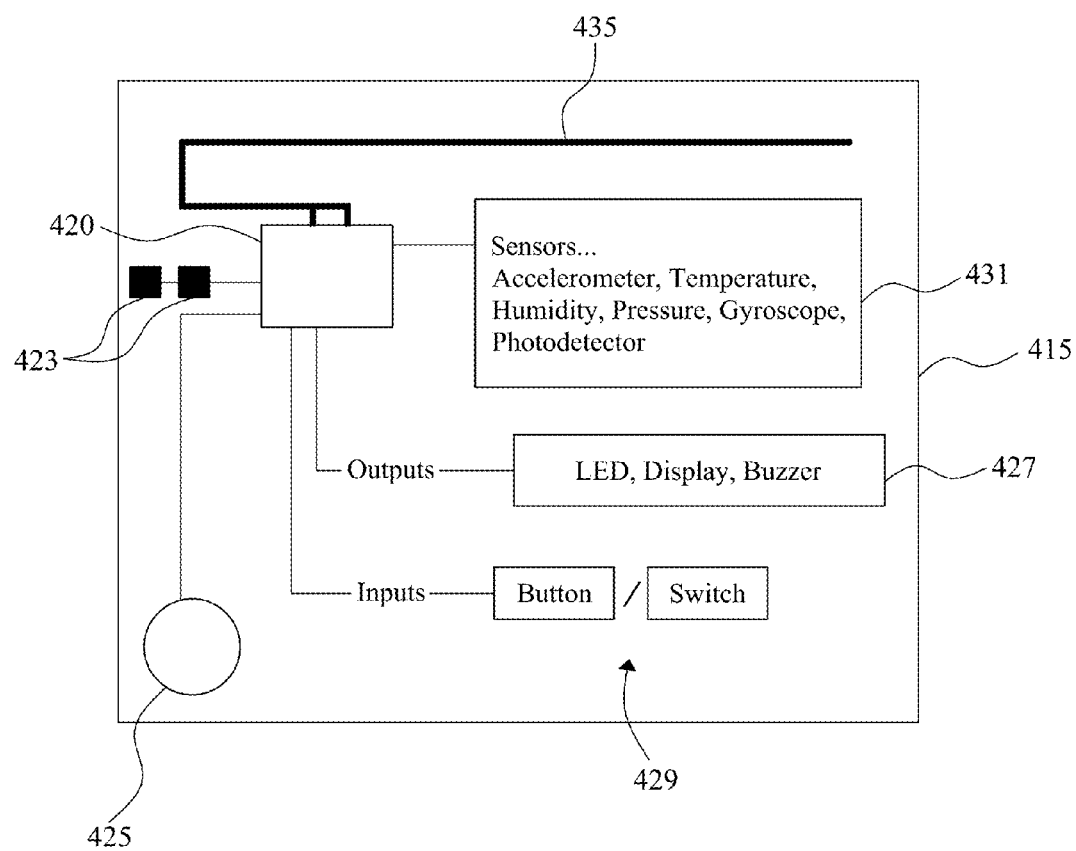
FIG. 4B is an illustration showing the Smart Badge size and layered components.

FIG. 4B is block illustration of circuit hardware in an exemplary Smart Badge 410. Evident is the RF-capable microprocessor 420 powered by a battery 425, resident on a "PC-board" 415. The microprocessor 420 utilizes crystal(s) 423 for timing and is coupled to inputs 429 and outputs 427 and also to one or more antenna(s) 435. One or more sensors 431 are coupled to the microprocessor 420 and can be sensor(s), which can detect acceleration, temperature, humidity, pressure, light, magnetic field, orientation, etc. The inputs 429 can be buttons, switches, touch sensors, etc. and the outputs 427 can be LEDs, buzzer, speaker, display, etc. While FIG. 4B shows various components, it is understood that more or less components, and different kinds of components can be implemented without departing from the spirit and scope herein. For example, the microprocessor 420 may utilize a separate "radio" chip for RF-conversion.

Figure 4C:
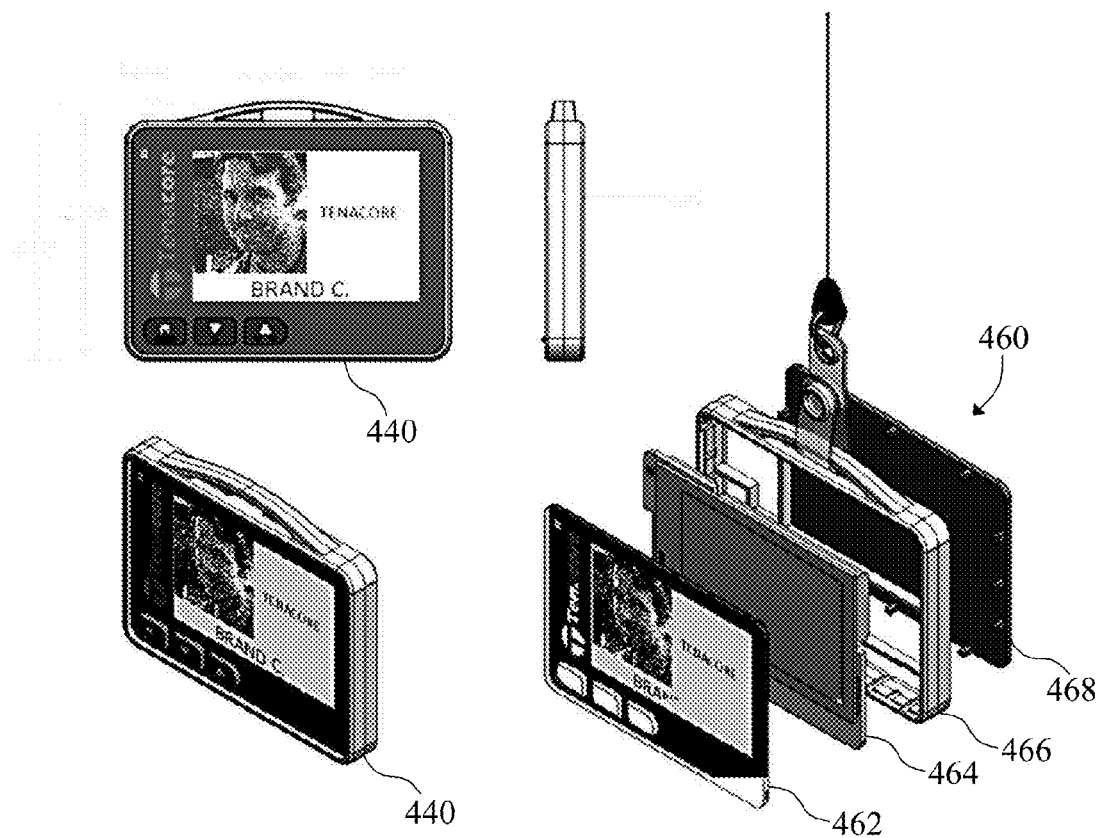
FIG. 4C is block illustration of circuit hardware in an exemplary Badge.

FIG. 4C is an illustration 450 showing various exploded views of an exemplary Smart Badge 440 and its layered components 460. Evident is sandwiching of the display/input panel 462 with PC board 464, which is backed by a backing panel 468 and encased with an outer bezel 466 which has a lanyard clip attached thereto. Of course, the Smart Badge 440 may utilize a clip or other mechanism for attaching the Smart Badge 440 to the user, making the Smart Badge 440 easily wearable. The size of the Smart Badge 440 in this particular configuration is approximately 2.5" tall× 3.2" wide×0.4" deep.

Figure 4D:
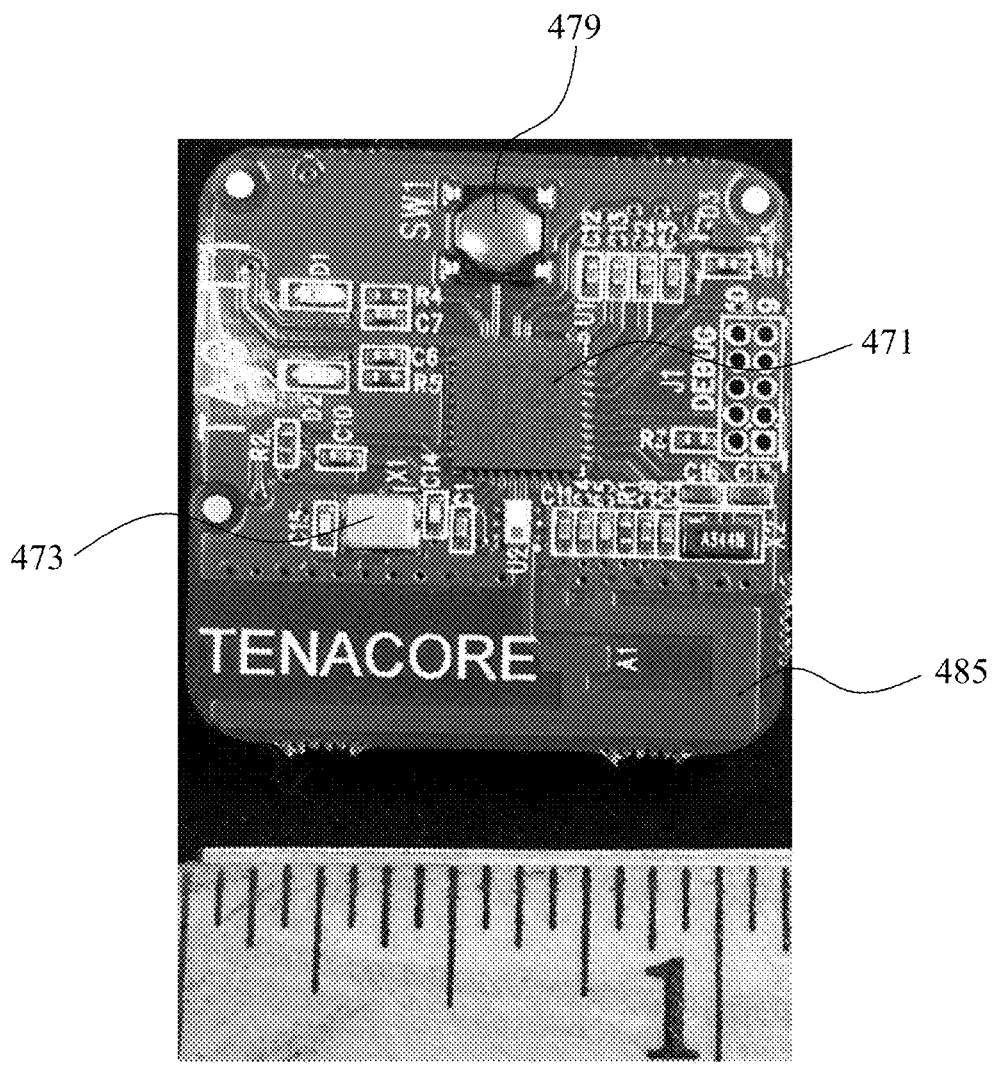
FIG. 4D is a photo-illustration of the hardware of an asset tag.

FIG. 4D is an image of the actual hardware in an asset tag 470, with RF-capable microprocessor 471 with crystal 473, input button/interface 479 and antenna 485. The form factor of the exemplary asset tag 470 is approximately 1" wide×1" wide×0.4" deep. Auxiliary components may be added, as per the Smart Badge described above, according to design preference. For example an audible signal, light, vibratory, other type of user feedback or security indicator can be incorporated. Therefore, while FIG. 4D shows the most basic asset tag 470 system, modifications/additions can be made without departing from the spirit and scope herein.

Figure 4E:
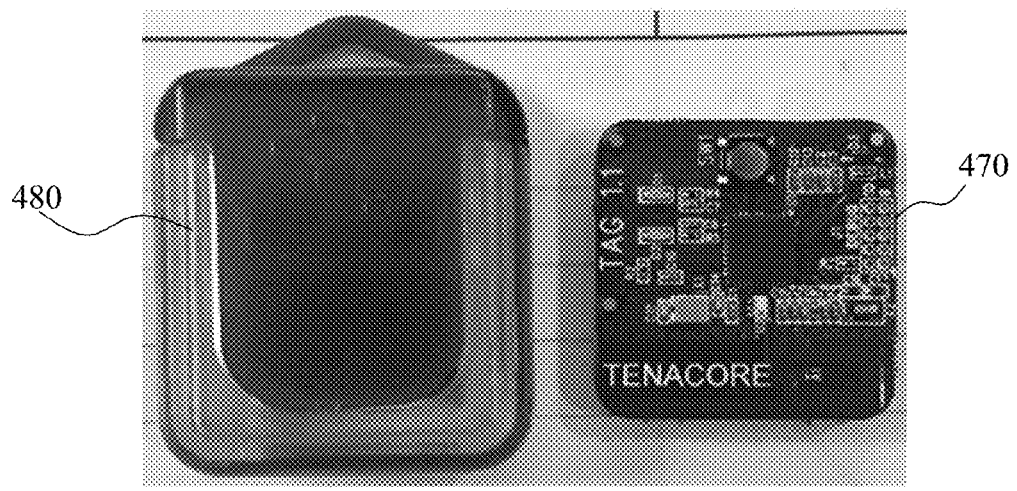
FIG. 4E is a photo-illustration of an asset tag with accompanying slide-in case.

FIG. 4E is an image of an asset tag 470 with accompanying case 480, which may or may not have charging capabilities, depending on design preference. The case 480 is facilitated to be a slide type, with a hanging and/or attachment mechanism, allowing the asset tag 470 to affixed to a tracked good.

Figure 4F:
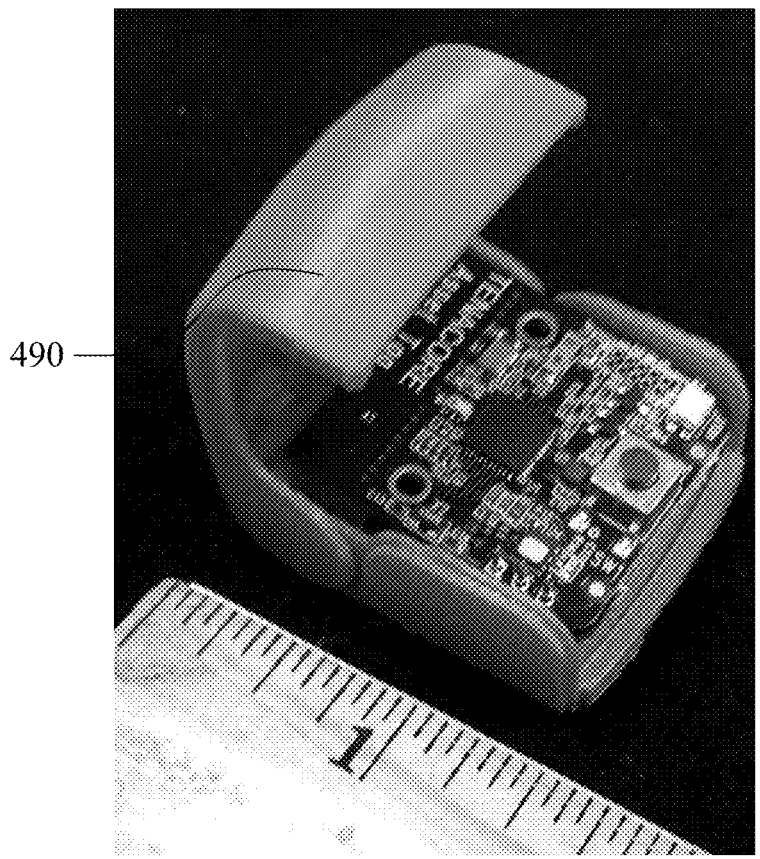
FIG. 4F is a photo-illustration of an asset tag in a hooded casing.

FIG. 4F is an illustration of an asset tag in a hooded casing 490. This embodiment contemplates various other possible housing styles, etc. for the asset tag. The embodiment of FIG. 4F can be hermetically sealed or environmentally sealed to prevent any exposure of external air/environment into the asset tag.

Figure 5:
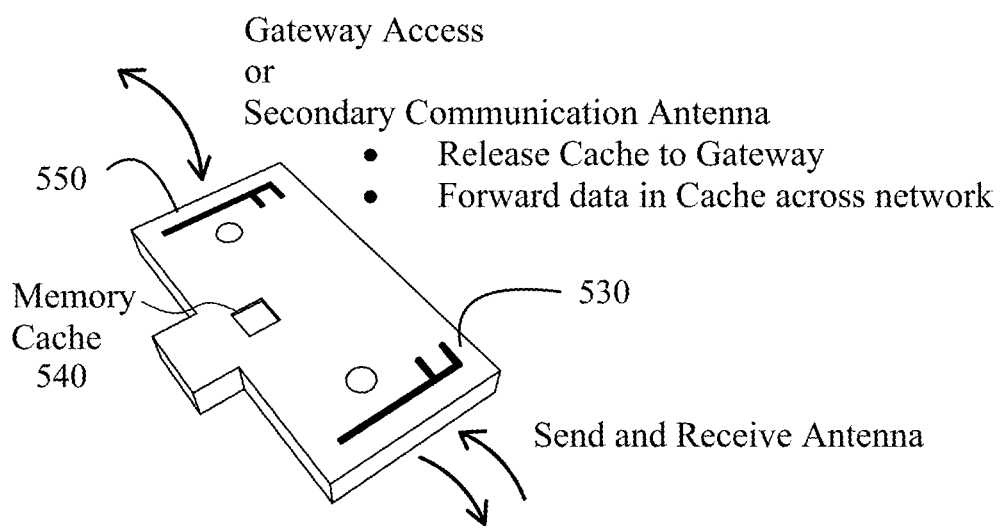
FIG. 5 is an illustration of a mains-powered Station that provides supporting services for Smart Badges.

FIG. 5 is an illustration of a Station 500 that provides supporting services for Smart Badges. The Station 500 can be mains-powered or battery-powered, depending on implementation preference. The Stations 500 are perimeter devices with known fixed location references and operate as communication gateways or nodes from the Smart Badges (and optionally the asset tags) to a hierarchal network connected to the host server. In some embodiments, the Stations 500 acts as "base" stations that mimic many of the button action features of the Smart Badges, sans the motion sensors or other activity-related sensors (since the Station is at a fixed location). The Station 500 may have LEDs, user input buttons and a USB (or equivalent) or local hardware connection, and is available as a hardware solution that communicates to a sub-network of Smart Badges, providing supporting messages/codes and other mesh-necessary information. Therefore, in some instances, the user may operate the available buttons/displays (if so-configured) on the Station 500 as a proxy to the Smart Badge. Therefore, the Stations 500 can be deployed in lieu of Smart Badges, if Smart Badges are not needed. A classic example would be the deployment of a Station 500 at an entrance/exit to a room. The various connections offered by the Station 500 may be a female or male, allowing the user to recharge, if desired, his Smart Badge.

In one possible scenario, the user's Smart Badge (not shown), when in proximity to the Station 500, alerts the Station 500 that an authorized user is nearby, and the Station 500 can "ping" the Smart Badge with appropriate req/ack signals to allow the Smart Badge access to the Station's functions. An "accessed" Station 500 can relay to the host server that the Smart Badge is in the Station's vicinity, and convey tracking data either solely from the Station's perspective or from data forwarded from the Smart Badge. The Station 500 may also provide some visual queues to the nearby users, for example, a light or color or indication may change to indicate connection to the Smart Badge or a status change. One possible example would the triggering of an alert or status change if a new Smart Badge has joined the mesh—indicating to the current users that someone has "entered the room." If the Station 500 is configured with a display, the Station 500 can act as a terminal, providing additional services/user input options to the Smart Badge wearer.

The Station 500, being not as "portable" as the Smart Badge (being mains-powered) is configured with additional microcontrollers (not shown), memory 540 (shown here as being used as cache), send and receive antenna 530 and additional antenna(s) 550. The additional antenna(s) 550 support switching protocols. Send and receive antenna 530 may be designated for proprietary (Ether Mesh and Ether Data, etc.,) communication for supporting the encrypted mesh data; and the other antenna(s) 550 for non-proprietary (Bluetooth Low Energy, or near-field, etc.) communication for supporting non-critical or non-encrypted mesh data or badge-to-badge data. Multiple clocks may be used, individually synchronized for the respective network connection. For example, one synchronized to a proprietary network using "EtherMesh" and another clock using Blue Tooth Low Energy (BLE) standard sequencing.

Software supporting the various embodiments described herein utilize Shared Network Intelligence, comprising node-based rules processing, node-initiated messaging and alerts, and distributed knowledge of node location. Of course, other software systems may be used by one of ordinary skill. The various Smart Badges (or tags, or Station) are understood to nodes within the software hierarchy. Data processing and presentation is derived from databases built from collected network information, using standardized reporting formats, including multiple presentation format options with map integration. Alerts settings are configurable for pop-up, SMS, email and other forms of communication a security condition to the appropriate entity.

Figure 6A:
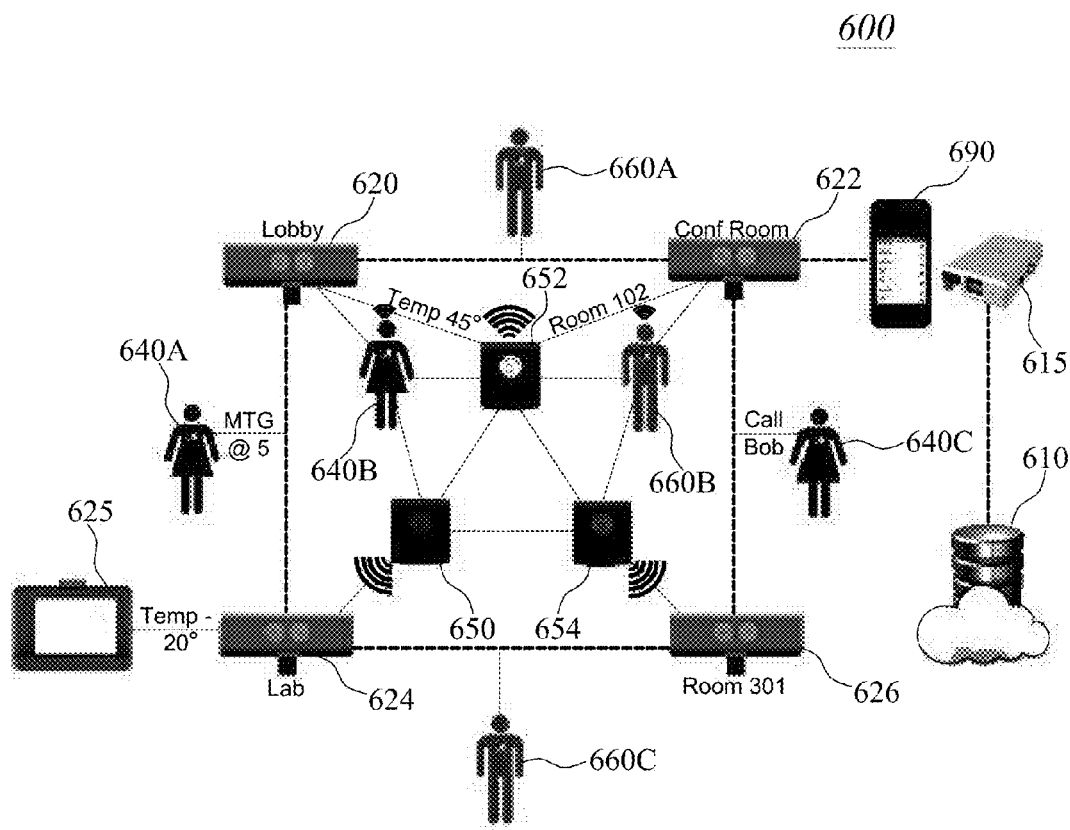
FIG. 6A is an illustration of a deployed system in an "office" environment, showing the functional integration of the various devices.

FIG. 6A is an illustration 600 of a deployed system in an "office" environment, showing the functional integration of the various devices. Central server 610 containing the security database is shown as located on a cloud, but may be local to the office. The central server 610 communicates to a wireless or wired gateway 615 that disseminates data to various Mesh Candy hardware in the office environment. Stations 620, 622, 624, 626 are located at the Lobby, Conference Room, Lab, and an arbitrary Room (here as room 301), respectively. Each Station represents a fixed area/location and can communicate to each other (via direct link or via hopping link) as well as to Smart Badges that are interior to and exterior to the fixed area/location. Equipment 650, 652, and 654 are asset tagged and are located via communication to nearby Stations. The asset tags can provide a status of the equipment, for example, equipment 650's asset tag has a red indicator, while equipment 652's asset tag has a white indicator, and equipment 654's asset tag has a yellow indicator. The indicator color (or status) displayed can inform a user as to whether the equipment is operational, or other relevant information, such as last-used operator, etc.

Since asset tags on the various equipment are mesh-linked to each other, in some embodiments, the user can query the asset tag to find other equipment. The asset tag's reply may be displayed on the asset tag (if so configured) or the information relayed to the user's Smart Badge. In other embodiments, the equipment may have access privileges allowing only authorized Smart Badge users to operate the equipment. For example, in FIG. 6A, user 640*b* is in proximity to equipment 650 and 652. Equipment 652's asset tag's white indicator may signify that user 640*b* (via her Smart Badge) is authorized to use equipment 650. Similarly, user 660*b* being in proximity to equipment 652 and similarly is offered a white indication, meaning he is allowed to use the equipment.

In contrast, user 640*b* , being in proximity to equipment 650 is shown a red indicator, to signify that she is not allowed to use the equipment 650. Or a yellow indicator for another condition. Of course, other associations may be made with respect to notifications that certain personnel can or cannot use (be authorized) the equipment. The association can be identified to all or a subset of users, so as to identify which personnel can (or cannot) use the equipment. Various other categorizations can be implemented, such as certain operational features of equipment may be segregated to different personnel, for example, a repair technician may be authorized to use only "broken" equipment, or may not operate a unit with a patient nearby, It is noted that the asset tags on equipment 650, 652, 654 have communication capabilities to respective Stations, via a direct link or via hopping from adjoining/nearby equipment.

Regarding activity logging of personnel, users 640*a* and 660*a* are shown here in different locations/time intervals. User 660*a* may enter the office building via the Lobby 620 and proceed to the Conference room 622. He is next shown moving 660*b* from the Conference room 622 through the office building and eventually exiting 660*c*. With location and time mapping, user 660*a* could be tracked throughout his visit to the office building.

Similarly, user 640*a* is shown with a Smart Badge signaling to her a notification or message that there is a meeting at 5 pm. She is also shown as within the proximity of the Lobby 620, and being fitted with a temperature sensor on her Smart Badge, a temperature of 45 Degrees is registered. User 640*c* subsequently is notified of a request to call Bob.

Smart Badge 625 is shown here as within Lab 624, and configured with a temperature sensor, registers an ambient temperature of −20 Degrees. Thus, location data can be discerned from knowledge that the Lab 624 is the only room in the building that maintains −20 Degrees.

Smart phone 690 or portable communication device 690 is illustrated here as one recipient of communications that may come from the Stations, Smart Badges, and/or the Server 610. For example, an alert, or message, etc., from the various hardware shown, can be forwarded to the portable communication device 690. Conversely, portable communication device 690 may send a message, call, etc. to a Smart Badge user, via communication channeled from the server 610.

Figure 6B:
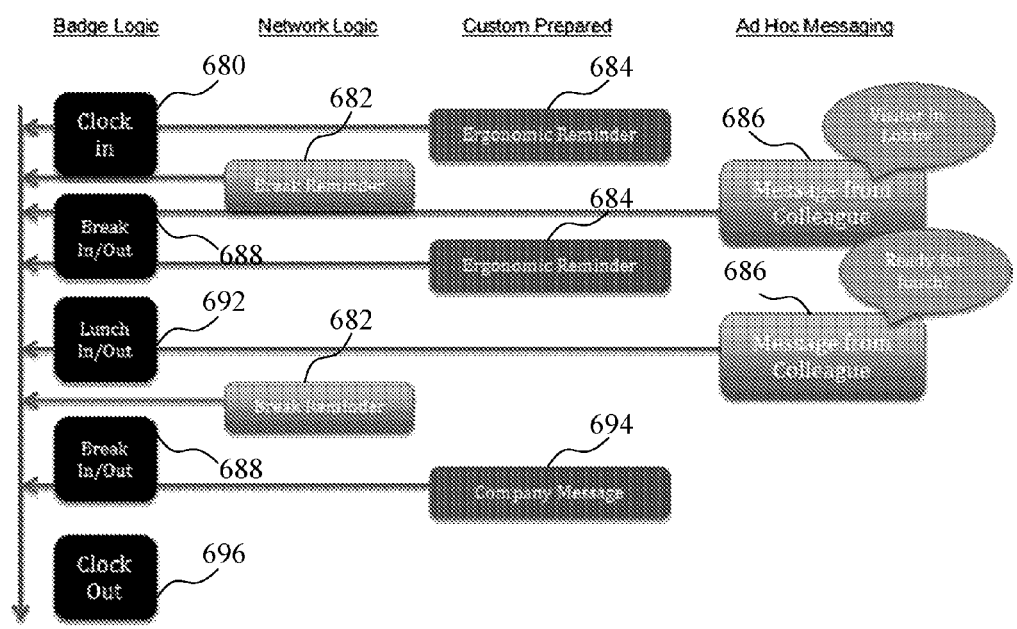
FIG. 6B is a process flow diagram of possible interactions between the exemplary system and a user in an office or work environment.

FIG. 6B is a process flow diagram of one mode of interactions between the exemplary system and a user such as 640*a* or 660*b* during the work shift in an office or work environment, and shows the potential for the Smart Badge. For example, Clock-in 680 can be initiated via interaction with the Smart Badge logic. Thus, the user is not required to "Log-in" into a computer terminal or system data network, which may contain sensitive information. Next, the network logic can inform the Smart Badge that a Break 682 is due.

Ergonomic reminders 684 can be forwarded from a Custom prepared reminder system. Messaging from colleagues, such as a visitor is in the lobby 686, can be forwarded to the Smart Badge via Ad Hoc Messaging capabilities. Break-in/out 688 and Lunch in/out 692 statuses can be activated from the Smart Badge. Company messages 694 can be sent to the Smart Badge. Finally, the user can Clock-out 696, through the Smart Badge.

Since the location of the user (or employee) would be known as well as work status ("on the clock," "at lunch," "break," etc.), there are different reminders that could be shared with the Smart Badge wearer that could provide benefits. For example, a reminder after 20 minutes in front of computer workstation to look-up for 20 seconds and focus on an object 20 feet away. Other ergonomic reminders can be "you've been seated for the last 45 minutes. This is a good time to take a walk break." Further examples of reminders can be local lunch specials presented when user selects "on lunch break." Of course, other reminders may be used according to design preference.

It should be apparent that the exemplary device(s) operates as a secure, wearable identification device with unique security features (as discussed above), while allowing work status input and/or office or colleague communication capabilities through a mesh communication environment, while maintaining a compact, ID-sized form factor.

Figure 7:
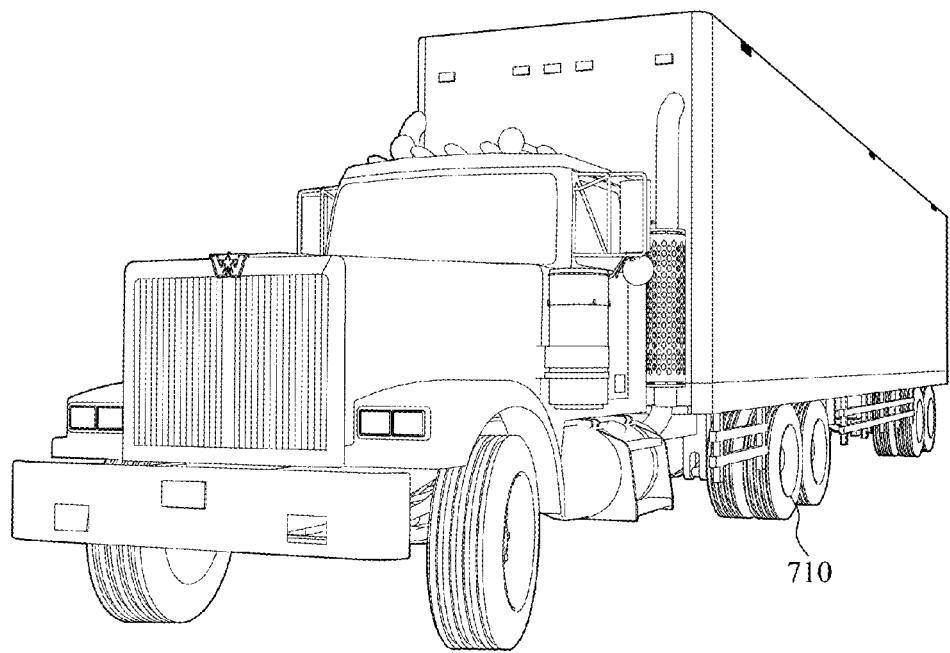
FIG. 7 is an illustration of a mobile platform with a deployed embodiment of an exemplary mesh system.

FIG. 7 is an illustration of a mobile platform 700 with a deployed embodiment of an exemplary mesh system (not shown). While FIG. 7 illustrates a truck 710, the exemplary approach can be applied to any moving vehicle, craft or ship, as well as to a fixed environment such as a building with mesh-tagged assets that can be moved (for example, sensitive containers, personnel, etc.). As one possible example, a surveillance van or ambulance will have a need to monitor and validate EMT personnel, visitors or mechanics, while serving its purpose for information collection or medical treatment.

Figure 8:
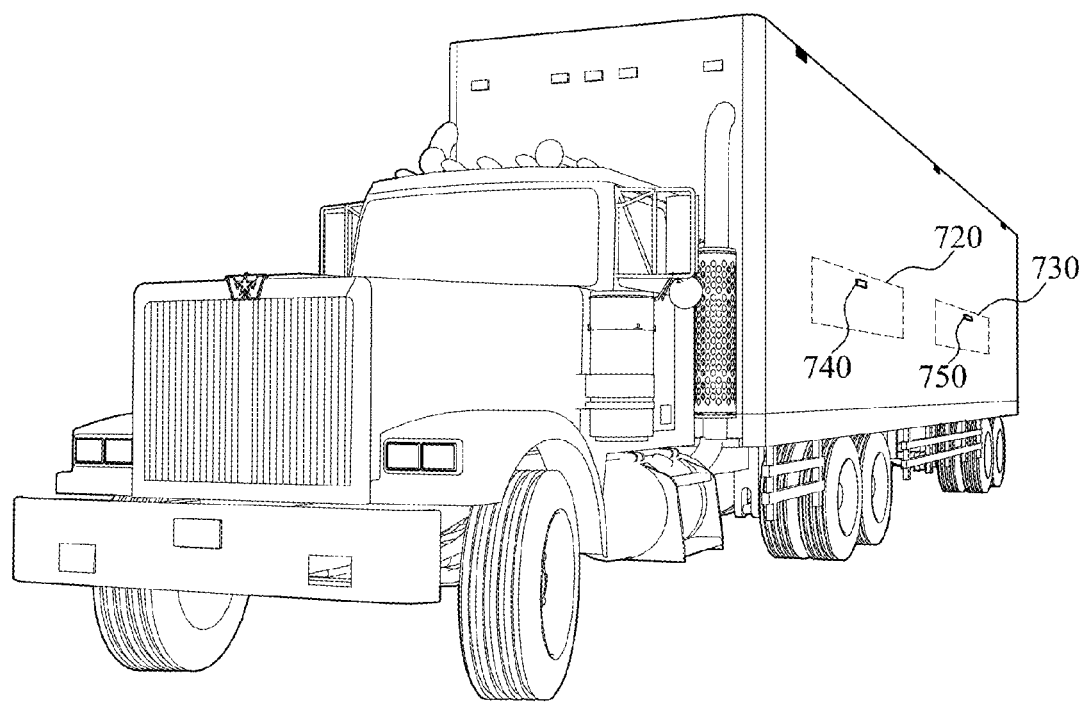
FIG. 8 is a perspective view of a vehicle with asset tags located on pallets within the vehicle's container.

FIG. 8 is an illustration of a target vehicle 710 with containers/products 720 and 730, shown here as pallets. Affixed to the pallets 720, 730 are exemplary asset tags 740 and 750. Asset tags 740 and 750 function using a mesh networking signaling protocol to establish a bidirectional communication link between the asset tags 740 and 750 and the mesh supporting the asset tags 740, 750. In addition, these asset tags 740 and 750 are configured to operate on a scheduled sleep cycle that can dynamically adjust it activity based upon established rules using environmental data, or activity data.

The asset tags 740 and 750 can be smaller battery powered units that can be affixed directly to pallets 720 and 730 using adhesive or secured mechanically. In a commercial embodiment, the asset tags 740 and 750 were designed to be approximately 1.5" in diameter or less than 2" square. These devices 740 and 750 are battery powered with a housing less than 1" in height. The compactness of these asset tags 740 and 750 allow them to be easily affixed to items as well as to personnel.

The asset tags 740 and 750 transmit their radio signal across the mesh. The resulting radio signal strength values or time of arrival values can be used to triangulate locations of individual asset tags 740 and 750.

Figure 9:
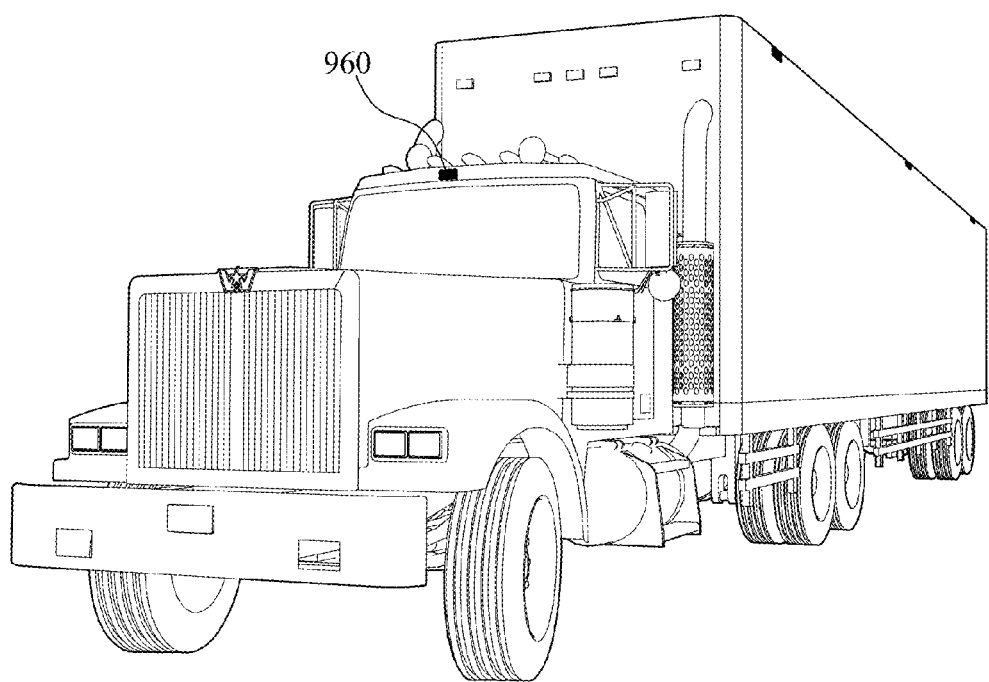
FIG. 9 is a perspective view with a Gateway device in the cab area of the vehicle.

FIG. 9 is an illustration of a gateway appliance 960 situated in the vehicle 710. The gateway device 960 is a wireless device and can operate from the cab of the vehicle 710 or within the rear container area. Of course, in other vehicle types, the location of the gateway device 960 may be altered, according to design preference. The gateway appliance 960 is able to communicate with the mesh network formed by the asset tags 740, 750 within the container. The gateway appliance 960 collects the local data and forwards the data to a servicing system that is not located on the vehicle 710. The servicing system can be a base computer, server, non-mesh network, etc. For example, the gateway appliance 960 may utilize an Internet Protocol (IP) network such as the cellular phone data network, to forward information to a system server (not shown). The gateway appliance 960 is capable of distributing data bidirectional so as to allow remote users the ability to interrogate data values obtained from asset tags 740 and 750 and sensing nodes 1070, 1080 and 1090 (seen in FIG. 10).

The gateway appliance 960, can function using battery power or mains power. The gateway appliance 960 supports the local mesh protocol and can be configured with a wide area network (WAN) protocol required for moving data across a WAN IP network. In a commercial embodiment, the gateway appliance 960 is cube shaped and less than 6"×6"×3" and can either be battery powered or mains powered.

Figure 10:
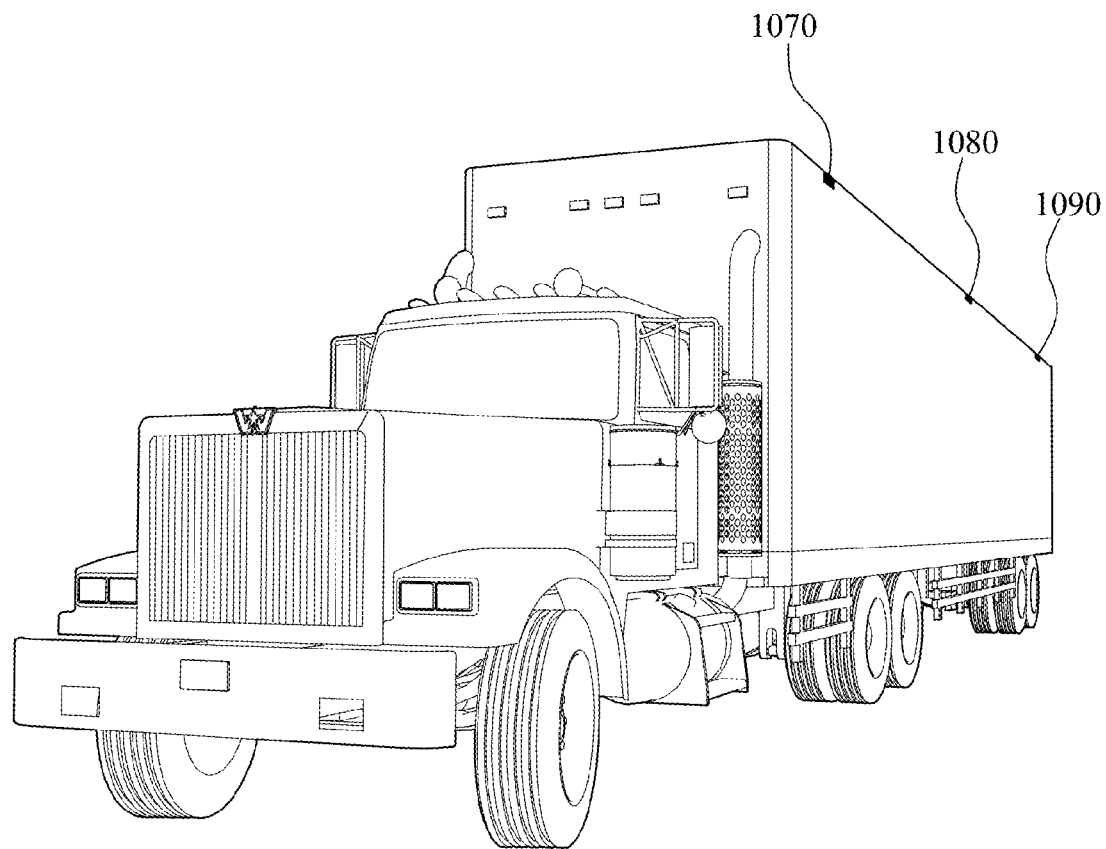
FIG. 10 is an illustration of an environmental and activity monitoring battery powered tags in the container.

FIG. 10 is an illustration showing environmental and activity sensing nodes 1070, 1080 and 1090. These sensing nodes 1070, 1080 and 1090 are wireless devices and join the formed mesh network and share communication with asset tags 740, 750 as well as communicate with gateway appliance 960. The sensing nodes 1070, 1080 and 1090 can be battery powered and function using a preset sleep cycle or dynamically adjust the sleep cycle based upon sensed data that includes environmental data or activity data. When data is collected from the sensing nodes 1070, 1080 and 1090, the data is passed to a bidirectional radio within the nodes and sent across the mesh network, through the gateway appliance 960 and across the WAN to a database on a supporting server or computer (not shown).

The sensing nodes 1070, 1080 and 1090, in a commercial embodiment were designed to be about 1.5" in diameter or less than 2" square. The sensing nodes 1070, 1080 and 1090 were designed to be battery powered with a housing less than 1" in height.

One or more of sensing nodes 1070, 1080 and 1090 can be configured to be similar to Asset Tags, wherein the Asset Tags could be a stripped down version of a sensing node, without the associated sensors (accelerometer/temp/humidity, etc.). In some embodiments, the Asset Tags without sensing is at least the Microcontroller, LED, power, RF antenna and related logic.

Figure 11:
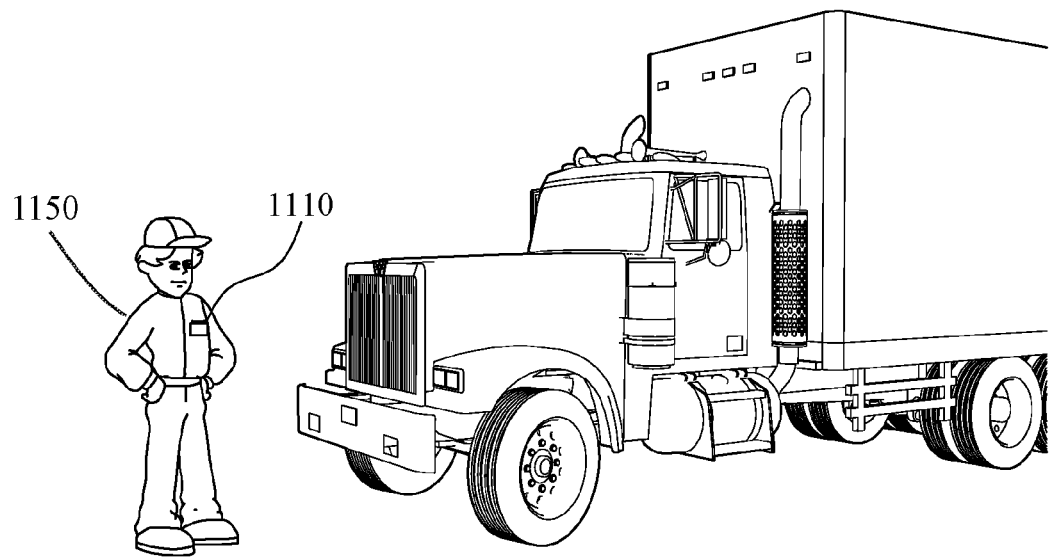
FIG. 11 is an illustration of a person with network verified identification badge.

FIG. 11 is an illustration of an authorized vehicle driver 1150 with a verifiable identification badge 1110. The identification badge 1110 is also contains a digital display with audio and visual presentation capabilities consistent with a Smart Badge/ID, as described above. The identification badge 1110 communicates across the mesh network and is able to communicate with the gateway appliance 960, the asset tags 740 and 750 and the sensing nodes 1070, 1080 and 1090. The identification badge 1110 is able to receive direct communication from the wide area network through the gateway appliance 960. Remote users can send messages directly to the identification badge 1110 and the identification badge 1110 emits radio signals to generate a radio signal strength value and similar to the asset tags 740. 750, location can be determined in proximity to the other nodes on the mesh.

Figure 12:
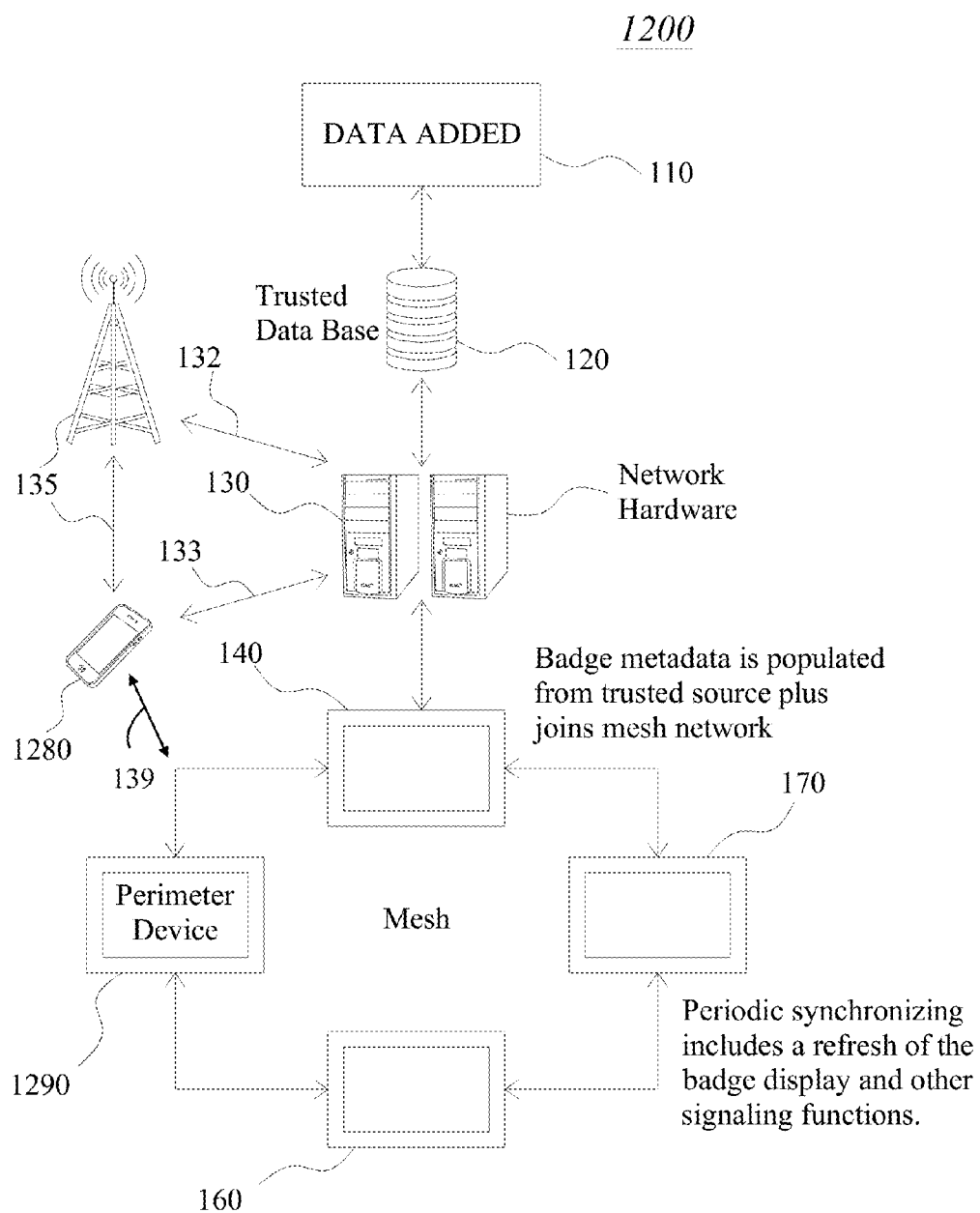
FIG. 12 is an illustration of an exemplary system using a user's personal smart phone as a proxy to a Smart Badge.

FIG. 12 is an illustration 1200 of an exemplary system using a user's personal smart phone 1280 as a proxy to a Smart Badge. In many ways the system of FIG. 12 is similar to the system shown in FIG. 1, however, the inclusion of a smart phone 1280 is implemented. Here, network hardware 130 is optionally in communication 132 with a cellular network 135 that provides cellular communication with smart phone 1280. It is stated the cellular network 135 is optional, as it is possible to have the smart phone 1280 join the mesh network via Wi-Fi, Bluetooth, NFC or any other local mesh-centric communication method, if so desired. That is, the network hardware 130 may have non-cellular communication 133 capability with smart phone 1280, similar to its communication capability with mesh devices 140, 160, 170, and 1290 (perimeter device). In some embodiments, the cellular network 135 may be utilized for initialization (security setup, configuration, etc.) with the smart phone 1280, wherein subsequent communications are facilitated through the local mesh.

Joining the mesh thorough the smart phone 1280 can be accomplished by the user downloading software into their smart phone 1280, for example, an "app" that is supported at least at the authentication level by the trusted database 120. After account approval, the user's smart phone 1280 is joined to the mesh network via a direct link 133 from the network hardware 130, or via cellular link 135, or via perimeter device 1290 link 139.

For example, a perimeter device 1290 is shown in this mesh, which has some or all of the features of FIG. 5's station, and sends location and/or validation codes to communicate to one or more of the mesh-compatible devices. In various embodiments, the smart phone 1280 picks up the validation code from a perimeter device 1290 in order to join the mesh. That code would be distributed from network hardware 130 across the mesh and then broadcast from each 1290 perimeter device. The change request would direct the network hardware 130 to provide a link 139 between the smart phone 1280 and the 1290 perimeter device, or to another mesh device 140, 160, 170, or another smart phone (not shown), if the respective devices are capable of meshing with smart phone 1280.

Since there are two antennas in the perimeter device 1290, one antenna can be dedicated to the Mesh network and the other antenna dedicated to sending the location and/or validation codes. And, if a smart phone 1280 is "meshed," codes can be configured to be sent in a smart phone 1280 compatible format, such as Blue Tooth Low Energy (BTLE), etc. Therefore, when someone with an "app" installed in their smart phone 1280 receives the validation code, that code enables them to show-up in the system tracking software (see FIG. 3, for example) as well as use the app's features to operate as a timeclock or status indicator (see FIG. 2A-B, for example) as well as record their presence and location over time. It should be appreciated that since the validation code(s) can be made to be unique at each perimeter device 1290, the code can also reveal the users' proximity to any station or perimeter device hardware.

Accordingly, in various embodiments, the verification and data exchange can be implemented through an existing mesh network by way of an available IP network, or implemented using a "backchannel" directly from the smart phone 1280 over the cellular network 135 or other smart phone 1280 reachable IP network, such as local Wi-Fi. This backchannel approach allows for bypassing the mesh network's communication system while performing the verification step. This backchannel approach maintains the integrity of the user as it relates to the security narrative and adds another option for validation directly from the Smart Phone 1280 through the "app." Since there is a proliferation of smart phones being used in the workplace, this approach is especially attractive as it does not require new (or temporary—e.g., visitors) entrants to acquire a dedicated Smart Badge. As elaborated below, this latter approach solves several Indoor network problems.

Indoor Network Problems Solved:

1. Conferences/universities. Currently most universities require students to purchase the IClicker® (a registered trademark of the MacMillian company) for attendance and basic user inputs. Utilizing an exemplary system as described above eliminates the IClicker® hardware and leverages students' existing smart phones while offering a means to validate presence. Other events like conferences or meetings don't currently utilize a local mesh network that validates and brings local users together temporarily. With an exemplary mesh network running, users will see each other on their "app" listing but they will not have to share more personal information such as phone # or social media handle. Contemplated herein are the use of aliases through the "app" and participation can be opted In/Out at each location that has an exemplary mess network.

2. The exemplary approach also replaces the hardware needed for timeclocking (e.g., Smart Badge) via a connected smart phone to verify the user's presence in the network and their location. The advantages of having presence-detection through a user's smart phone for timeclock management avoids attendance role calls or other time-consuming processes.

3. The exemplary approach also enables micro-location messages/announcements to be broadcast or point-to-point sent by the perimeter device. These micro-location messages can be sent to a Smart Badge or smart phone. In some embodiments, the cellular network can be utilized to forward these messages/announcements, if the mesh mechanism is not available, or vice versus. These messages can be location specific, for example, "new equipment has been installed in this room", "sale on all items in aisle 15", etc.

Accordingly, as will be appreciated by one skilled in the art, the present disclosure contains hardware devices that may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

In general, it should be understood that the devices described herein may be implemented using integrated circuit development technologies, or via some other methods, or the combination of hardware and software objects could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

What is claimed is:

1. An automated method for protecting against a falsified identity of a person and/or asset amongst authorized identities of persons and/or asset, comprising:

registering at least one of an authorized user's identity and authorized asset to be tracked in a trusted database;

associating, if for a registered user, the
registered user's identity and a user's image with a mesh-communication capable digital identification badge, the badge being wearable and comprising a microprocessor with RF capabilities, user-actuated button, LED, display, buzzer, antenna, and motion sensor, and if associating for a registered asset, the
registered asset with a mesh-communication capable digital identification asset tag, the tag being attachable to the asset and comprising a microprocessor with RF capabilities, user-actuated button, LED, display, buzzer, and antenna;

locally networking the at least one badge and tag into a mesh network, the mesh forming between registered devices having a shared authorization;

wirelessly sending from a network node an encrypted and varied security code to the locally meshed badge and/or tag;

receiving into the locally meshed badge and/or tag, the security code;

validating the security code with the locally meshed badge and/or tag; and changing, if validated with the locally meshed badge, at least one of an audible or visual characteristic of the badge, comprising, at least one of a prior image on the display with a new image, prior color on the LED with a new color, prior LED flash rate with new flash rate, prior buzzer beep rate with new beep rate, prior buzzer tone with new buzzer tone, prior background image with new background image, prior wearer's image with new wearer's image, prior wording with new wording, and prior logo with new logo, and if validated with the locally meshed tag, changing at least one of an audible or visual characteristic of the tag, comprising at least one of a prior image on the display with a new image, prior LED color with new color, prior LED flash rate with new flash rate, prior buzzer beep rate with new buzzer beep rate, prior buzzer tone with new buzzer tone, prior background image with new background image on the display, prior asset's image with new asset's image on the display, prior wording with new wording on the display, and prior logo with new logo on the display, wherein a badge or tag that does not change with the validated badge(s) or tag(s) is an indication to personnel with validated badge(s) and personnel monitoring assets that the unchanged badge or tag is counterfeit.

2. The method of claim 1, further comprising, detecting at least one of a current location, status, temperature, orientation of the badge and/or tag and recording a history thereof for visual playback.

3. The method of claim 2, wherein the status is altered by changing an orientation of the badge.

4. The method of claim 1, wherein the badge is utilized as a timeclock, displaying at least one of a "clock-in," "clock-out," "break," "off-break" status and a status is alterable by an user input to the badge.

5. The method of claim 1, wherein the badge and/or tag further senses at least one of temperature, humidity, pressure, orientation, and light.

6. The method of claim 1, further comprising, communicating to a secondary gateway communication device having a network access antenna and a secondary antenna for local communication with mesh devices, the secondary device acting as a gateway node to the trusted database for the meshed badges and/or tags.

7. The method of claim 6, wherein the communicated message or alert is based on different levels of security or access.

8. The method of claim 1, further comprising, communicating at least one of a message or alert from the trusted database to a badge, a message or alert between badges, a message or alert to a non-meshed badge or non-meshed smart phone.

9. The method of claim 8, wherein the message includes at least one of a break reminder, ergonomic activity reminder, and company message.

10. The method of claim 1, wherein a communication rate with the network node is variable and increased if a rate of motion of the badge and/or tag is above a pre-determined threshold.

11. The method of claim 1, further comprising:
loading an app into a smart phone;
registering the use of the smart phone via the app; and
joining the mesh as proxy to the badge.

12. The method of claim 11, wherein the registering is performed using a cellular network.

13. An automated system for protecting against a falsified identity of a person and/or object amongst authorized identities of persons and/or objects, comprising:
a trusted database having identity information of a registered person and/or registered asset;
at least one of
(a) a mesh-communication capable digital identification badge, the badge being wearable and comprising a microprocessor with RF capabilities, user-actuated button, LED, display, buzzer, antenna, and motion sensor, and
(b) registered asset with a mesh-communication capable digital identification asset tag, the tag being attachable to the asset and comprising a microprocessor with RF capabilities, user-actuated button, LED, display, buzzer, and antenna;
a local communication mesh between the at least one badge and tag, the mesh formed between registered devices having a shared authorization;
a network node with a wireless connection, sending an encrypted and varied security code to the locally meshed devices;
software instructions in the at least one locally meshed badge and tag, validating the security code and changing at least one of an audible or visual characteristic in the badges and/or tags, the audible or visual characteristic being changed being at least one of a prior image on the display with a new image, prior color on the LED with a new color, prior LED flash rate with new flash rate, prior buzzer beep rate with new beep rate, prior buzzer tone with new buzzer tone, prior background image with new background image, prior wearer's image with new wearer's image, prior wording with new wording, and prior logo with new logo,
wherein a badge or tag whose audible or visual characteristic does not change is an indication to personnel that the unchanged badge or tag is counterfeit.

14. The system of claim 13, wherein the badge or tag further contains at least one of an accelerometer, temperature sensor, humidity sensor, pressure sensor, gyroscope, and photodetector.

15. The system of claim 13, further comprising, a secondary gateway communication device having a network access antenna and a secondary antenna for local communication with mesh devices, the secondary device acting as a gateway node to the trusted database for the meshed badges and/or tags.

16. The system of claim 13, further comprising:
a smart phone; and
an app loaded onto the smart phone, the app interfacing with the trusted database and permitting a user to register with the trusted database,
wherein the app enables the smart phone to join the mesh as a proxy to the badge.

* * * * *